US007087676B2

(12) United States Patent
Mazanek et al.

(10) Patent No.: US 7,087,676 B2
(45) Date of Patent: *Aug. 8, 2006

(54) BLOCKED POLYISOCYANATES

(75) Inventors: Jan Mazanek, Köln (DE); Reinhard Halpaap, Odenthal (DE); Markus Mechtel, Bergisch Gladbach (DE); Thomas Klimmasch, Leverkusen (DE); Christoph Thiebes, Köln (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/874,716

(22) Filed: Jun. 23, 2004

(65) Prior Publication Data

US 2004/0266969 A1 Dec. 30, 2004

(30) Foreign Application Priority Data

Jun. 27, 2003 (DE) ................ 103 28 993

(51) Int. Cl.
*C08G 18/80* (2006.01)
*C07C 275/08* (2006.01)
*C07C 275/12* (2006.01)
*C07C 275/14* (2006.01)
*C07C 275/16* (2006.01)

(52) U.S. Cl. ............ 524/591; 252/182.2; 252/182.21; 427/385.5; 524/839; 524/840; 528/45; 528/49; 564/32; 564/47; 564/57; 564/58; 564/61

(58) Field of Classification Search ............ 252/182.2, 252/182.21; 427/385.5; 524/591, 839, 840; 528/45, 49; 564/32, 47, 57, 58, 61
See application file for complete search history.

(56) References Cited

U.S. PATENT DOCUMENTS

| 4,173,567 | A | * | 11/1979 | Findeisen et al. ............ 548/216 |
| 4,242,489 | A | * | 12/1980 | Findeisen et al. ............ 528/73 |
| 4,247,689 | A | * | 1/1981 | Findeisen et al. ............ 544/97 |
| 4,482,721 | A |   | 11/1984 | Wegner et al. ............ 548/262 |
| 4,495,229 | A | * | 1/1985 | Wolf et al. ............ 427/388.2 |
| 4,757,113 | A |   | 7/1988 | Paar ............ 525/124 |
| 4,976,837 | A |   | 12/1990 | Hughes et al. ............ 204/181.7 |
| 5,126,393 | A |   | 6/1992 | Blum et al. ............ 524/538 |
| 5,246,557 | A |   | 9/1993 | Hughes et al. ............ 204/181.4 |
| 5,294,665 | A |   | 3/1994 | Pedain et al. ............ 524/591 |
| 5,352,755 | A |   | 10/1994 | Hughes et al. ............ 528/45 |
| 5,455,297 | A |   | 10/1995 | Pedain et al. ............ 524/591 |
| 5,621,063 | A |   | 4/1997 | Wolf et al. ............ 528/45 |
| 5,986,033 | A |   | 11/1999 | Hughes et al. ............ 528/45 |
| 6,063,860 | A |   | 5/2000 | Rimmer et al. ............ 524/590 |
| 6,368,669 | B1 |  | 4/2002 | Hughes et al. ............ 427/385.5 |
| 6,784,243 | B1 | * | 8/2004 | Rische et al. ............ 524/591 |

FOREIGN PATENT DOCUMENTS

| CA | 1 187 083 | 5/1985 |
| CA | 2163169 | 5/1996 |
| CA | 2253119 | 5/1999 |
| EP | 157 291 | 7/1989 |

OTHER PUBLICATIONS

Progress in Organic Coatings, 36, 1999, pp. 148-172, Douglas A. Wicks, Zeno W. Wicks, Jr., "Blocked isocyanates III: Part A. Mechanisms and chemistry".
Progress in Organic Coatings, 9, 1981, pp. 3-28, Zeno W. Wicks, Jr., "New Developments in the Field of Blocked Isocyanates".
Progress in Organic Coatings, 3 1975, pp. 73-99, Zeno W. Wicks, Jr., "Blocked Isocyanates".
Houben-Weyl, Methoden der Organischen Chemie, vol. XIV/2, 1963, pp. 1-47, Dr. Erwin Müller, "Polycarbonsäureester".

* cited by examiner

Primary Examiner—Rabon Sergent
(74) Attorney, Agent, or Firm—Joseph C. Gil; Thomas W. Roy

(57) ABSTRACT

Blocked polyisocyanates and one-component stoving systems containing these blocked polyisocyanates, and the preparation thereof and their use for the preparation of lacquers, paints, adhesives and elastomers, wherein blocked polyisocyanates are prepared by reacting polyisocyanates with secondary amines corresponding to the formula

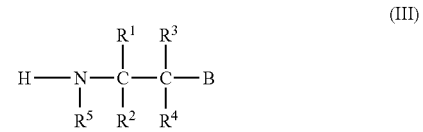

wherein
$R^1$—$R^4$ can be identical or different and denote hydrogen, $C_1$–$C_6$-alkyl or cycloalkyl,
$R^5$ denotes $C_1$–$C_{10}$-alkyl, $C_3$–$C_{10}$-cycloalkyl,
y denotes a number from 2 to 8, and
B represents

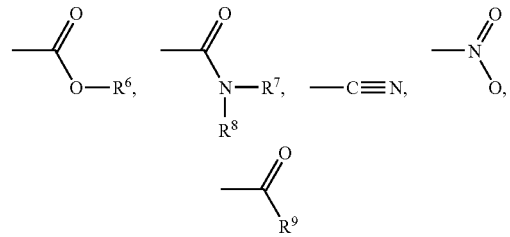

wherein $R^6$–$R^8$ can be identical or different and independently of one another denote $C_{1-6}$-alkyl and/or $C_3$–$C_6$-cycloalkyl, $R^9$ denotes hydrogen or $C_{1-6}$-alkyl or $C_3$–$C_6$-cycloalkyl.

15 Claims, No Drawings

BLOCKED POLYISOCYANATES

CROSS REFERENCE TO RELATED PATENT APPLICATION

The present patent application claims the right of priority under 35 U.S.C. §119 (a)–(d) of German Patent Application No. 103 28 993.3, filed Jun. 27, 2003.

FIELD OF THE INVENTION

The present invention relates to new blocked polyisocyanates and self-crosslinking one-component stoving systems and their use for the preparation of lacquers, paints, adhesives and elastomers.

BACKGROUND OF THE INVENTION

The use of blocking agents for temporary protection of isocyanate groups has been known for a long time. Blocked polyisocyanates are employed, inter alia, for the preparation of thermosetting one-component polyurethane stoving systems (1C PU stoving systems) which are stable to storage at room temperature. The blocked polyisocyanates are mixed here e.g. with polyesters containing hydroxyl groups, polyacrylates, other polymers and further constituents of lacquers and paints, such as pigments, co-solvents or additives. Self-crosslinking stoving systems which contain, as binders, polymers which contain both blocked isocyanates and hydroxyl groups in one molecule are another form of stoving lacquers which are stable to storage at room temperature.

Overviews of the use of blocked polyisocyanates are to be found, for example, in Wicks, Z. Progress in Organic Coatings 3 (1975) 73–99, Wicks, Z. Progress in Organic Coatings 9 (1981) 3–28, D. A. Wicks and Z. W. Wicks, Progress in Organic Coatings, (1999), 148–172.

The most important compounds which are employed for blocking polyisocyanates are ε-caprolactam, methyl ethyl ketoxime (butanone oxime), malonic acid diethyl ester, secondary amines and triazole and pyrazole derivatives, such as are described e.g. in EP-A 0 576 952, EP-A 0 566 953, EP-A 0 159 117, U.S. Pat. No. 4,482,721, WO 97/12924 or EP-A 0 744 423.

Secondary amines are described as blocking agents in EP-A 0 096 210. However, only amines containing alkyl, cycloalkyl and aralkyl groups are mentioned expressly as blocking agents there. Amines which contain functional groups with carbon-heteroatom multiple bonds or heteroatom-heteroatom multiple bonds are not mentioned explicitly there. The polyisocyanates blocked with the secondary amines described in EP-A 0 096 210 furthermore cannot be used generally for the preparation of solvent-containing or "high solids" lacquers since they have an inadequate solubility in organic solvents.

The most frequently employed blocking agents for isocyanates are ε-caprolactam and butanone oxime. While as a rule stoving temperatures of about 160° C. or higher are used in the case of ε-caprolactam, blocked 1C PU stoving lacquers in which butanone oxime has been employed as the blocking agent can already be stoved at temperatures 10 to 20° C. lower. For modern lacquer systems, however, a further lowering of the stoving temperatures required is aimed for, on the one hand in order to save energy and to be able to operate the stoving ovens at lower temperatures, and on the other hand in order also to be able to coat heat-sensitive substrates with such 1C PU lacquers.

Blocked polyisocyanates with which 1C stoving systems with lower stoving temperatures can be formulated can be prepared by blocking polyisocyanates with malonic acid diethyl ester, 1,2,4-triazole and diisopropylamine. However, these have the disadvantage that they are not sufficiently soluble in organic solvents, in particular in combination with polyisocyanates based on linear aliphatic diisocyanates, and crystallize out of these solutions and therefore cannot be employed generally. Furthermore, low-stoving 1C PU stoving systems based on polyisocyanates blocked with 3,5-dimethylpyrazole can be formulated. These have the disadvantage that 3,5-dimethylpyrazole is a solid at room temperature and is therefore difficult to meter. For metering in liquid form, it must be dissolved in a lacquer solvent at elevated temperatures or melted, which represents an additional working step. EP-A 0 0713 871 indeed discloses a process for the preparation of polyisocyanates blocked with 3,5-dimethylpyrazole in which 3,5-dimethylpyrazole is prepared in a lacquer solvent and the reaction solution is employed for the blocking immediately, without isolation of a solid, but an increased outlay on apparatus and/or time and the use of carcinogenic hydrazine for the preparation of the blocking agent are necessary in this process. Moreover, it cannot always be ruled out that by-products of the preparation of 3,5-dimethylpyrazole will get into the product and lead to impairments of the product, e.g. of its colour.

The present invention was therefore based on the object of providing blocked polyisocyanates which do not have the abovementioned disadvantages of the prior art and in particular render possible a lower crosslinking or stoving temperature than butanone oxime-blocked polyisocyanates, are stable to crystallization in organic solutions and can be prepared in a simple manner.

SUMMARY OF THE INVENTION

The present invention is directed to blocked polyisocyanates according to formula (I)

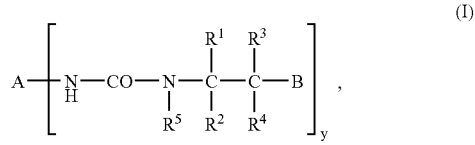

where each occurrence of $R^1$–$R^4$ is independently-hydrogen, $C_1$–$C_6$-alkyl or cycloalkyl, $R^5$ is $C_1$–$C_{10}$-alkyl or $C_3$–$C_{10}$-cycloalkyl, y is a number from 1 to 8, A is a radical of an isocyanate of functionality y, and B is a group according to one of the following structural formulas

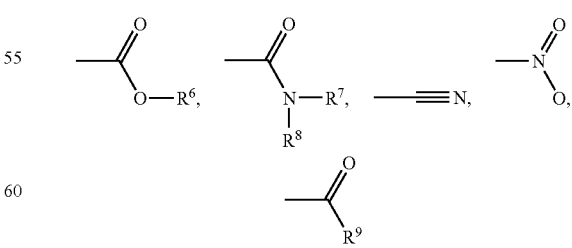

where each occurrence of $R^6$–$R^8$ are independently selected from $C_1$–$C_6$-alkyl or $C_3$–$C_6$-cycloalkyl and $R^9$ is hydrogen, $C_1$–$C_6$-alkyl or $C_3$–$C_6$-cycloalkyl.

The present invention is also directed to a process for preparing the above-described blocked polyisocyanates including reacting polyisocyanates according to formula (II)

(II)

with secondary amines according to formula (III)

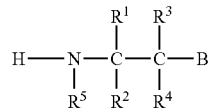
(III)

where A, y, $R^1$–$R^5$ and B are as defined above.

The present invention is further directed to a one-component polyurethane stoving system that includes the above-described blocked polyisocyanate as a crosslinking agent and one or more polyol components.

The present invention is additionally directed to elastomer compositions prepared by combining the above-described blocked polyisocyanates with one or more polyols.

The present invention also provides lacquer, paint or adhesive compositions that include the above-described blocked polyisocyanates and one or more components selected from solvents, pigments, fillers, flow agents, defoamers, and catalysts.

The present invention further provides aqueous dispersions that include the present blocked polyisocyanates as well as solutions of the blocked polyisocyanates in organic solvents.

The present invention additionally provides a process for coating substrates that includes applying a coating formulation containing the above-described blocked polyisocyanates and stoving the coating at temperatures of 90 to 160° C. or at a peak temperature of 130 to 300° C.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

This object of the present invention has been achieved with the blocked polyisocyanates according to the invention and self-crosslinking one-component stoving systems containing these.

The present invention provides blocked polyisocyanates of the formula (I)

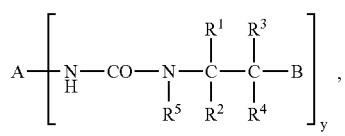
(I)

wherein
  $R^1$–$R^4$ can be identical or different and denote hydrogen, $C_1$–$C_6$-alkyl or cycloalkyl,
  $R^5$ denotes $C_1$–$C_{10}$-alkyl, $C_3$–$C_{10}$-cycloalkyl,
  y denotes a number from 2 to 8,
  A denotes the core of an isocyanate of functionality y,
  B represents

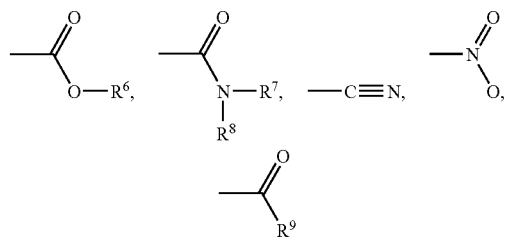

wherein $R^6$–$R^8$ can be identical or different and independently of one another denote $C_1$–$C_6$-alkyl and/or $C_3$–$C_6$-cycloalkyl, $R^9$ denotes hydrogen or $C_1$–$C_6$-alkyl or $C_3$–$C_6$-cycloalkyl.

The invention also provides a process for the preparation of the blocked polyisocyanates of the formula (I), characterized in that polyisocyanates with the general formula (II)

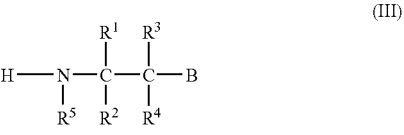
(II)

wherein A and y have the meaning given under formula I, are reacted with secondary amines of the general formula (III)

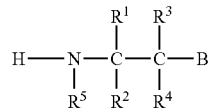
(III)

wherein $R^1$–$R^5$ and B have the meaning given in the case of formula (I).

The invention also provides the use of the blocked polyisocyanates according to the invention for the preparation of lacquers, paints and other stoving systems, such as adhesives or elastomers, and as an additive in the vulcanization of rubbers, as well as processes for coating substrates with lacquers which comprise the blocked polyisocyanates according to the invention, and furthermore objects of these materials and substrates coated with them.

The blocking agents of the formula (III) can be prepared, for example, by reaction of primary amines on compounds with activated carbon-carbon double bonds, such as are described, for example, in Organikum, 19th edition, Deutscher Verlag der Wissenschaften, Leipzig, 1993, pages 523 to 525. In this reaction, a primary amine reacts selectively with a carbon-carbon double bond to give a secondary, unsymmetric amine. Substances which can be interpreted as reaction products in the sense described above of sterically hindered primary alkylamines, such as, for example, sec-butylamine, tert-butylamine, optionally alkyl-substituted cyclohexylamine, iso-propylamine, cyclopropylamine, the branched or cyclic isomers of pentyl-, hexyl-, heptyl-, octyl- and nonylamine or benzylamine, and compounds with an activated carbon-carbon double bond, such as, for example, α,β-unsaturated carboxylic acid esters, α,β-unsaturated N,N-carboxylic acid dialkylamides, nitroalkenes, aldehydes and ketones, are preferably used as blocking agents of the formula (III). Substances which can be interpreted as addition products of primary amines on alkyl esters of acrylic, methacrylic and crotonic acid, such as methyl methacrylate, iso-norbornyl methacrylate, ethyl methacrylate, n-propyl methacrylate, iso-propyl methacrylate, n-butyl methacrylate, iso-butyl methacrylate, 2-ethylhexyl methacrylate, methyl acrylate, ethyl acrylate, n-propyl acrylate, iso-propyl acrylate, iso-norbornyl acrylate, n-butyl acrylate, tert-butyl acrylate, iso-butyl acrylate, 2-ethylhexyl acrylate, crotonic acid methyl ester, crotonic acid ethyl ester, crotonic acid propyl ester, are particularly preferably used.

Substances which can be interpreted as the addition product of tert-butylamine or iso-propylamine or cyclohexylamine on to methyl or ethyl or propyl or iso-propyl or n-butyl or iso-butyl or tert-butyl esters of acrylic or methacrylic or crotonic acid are preferably used.

Substances which can be interpreted as the addition product of tert-butylamine on to methyl acrylate or the addition product of tert-butylamine on to methyl methacrylate or the addition product of tert-butylamine on to tert-butyl acrylate are particularly preferably used.

The preparation of the blocking agents can take place in a suitable, preferably polar solvent. The desired products can optionally be separated from the solvent and/or by-products by distillation or by extraction and then reacted with the polyisocyanates. However, it is also possible to carry out the reaction in a suitable lacquer solvent and to use the reaction mixture obtained directly for the preparation of the blocked polyisocyanates.

Blocking agents of the formula (III) which have been prepared by a route other than that described above, for example by transesterification of an ethyl ester of the formula (III) into a methyl ester, can of course also be used.

Blocking agents of the formula (II) can of course be used in any desired mixtures with one another.

As polyisocyanates (II) which are employed for the preparation of the blocked polyisocyanates according to the invention, triisocyanatononane and all the known aliphatic, cycloaliphatic and aromatic diisocyanates and the polyisocyanates based on them having an isocyanate content of 0.5 to 60, preferably 3 to 30, particularly preferably 5 to 25 wt. % or mixtures thereof can be employed. These are, for example, polyisocyanates based on 1,4-diisocyanatobutane, 1,6-diisocyanato-hexane (HDI), 2-methyl- 1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,6- and 2,4-diisocyanato-1-methylcyclohexane, 1,3- and 1,4-bis-(isocyanatomethyl)-cyclohexane, 1-isocyanato-3,3,5-trimethyl-5-isocyanatomethylcyclohexane (isophorone-diisocyanate, IPDI), 2,4- and 4,4'-diisocyanatodicyclohexylmethane, 1-isocyanato-1-methyl-4(3)isocyanato-methylcyclohexane (IMCI), bis-(isocyanatomethyl)-norbornane, 1,3- and 1,4-bis-(2-isocyanato-prop-2-yl)-benzene (TMXDI), 2,4- and 2,6-diisocyanatotoluene (TDI), diphenylmethane-2,4'- and/or -4,4'-diisocyanate (MDI), 1,5-diisocyanatonaphthalene or the corresponding diisocyanates.

Polyisocyanates which contain oxadiazinetrione groups, carbodiimide groups, allophanate groups, isocyanurate groups, iminooxadiazinetrione groups, urethane groups and biuret groups are preferably suitable. According to the invention, the known polyisocyanates which are chiefly used in the preparation of lacquers are particularly suitable for use, e.g. modification products of the abovementioned simple diisocyanates, in particular hexamethylene-diisocyanate or isophorone-diisocyanate or 2,4'- or 4,4'-diisocyanatodicyclohexylmethane, containing oxadiazinetrione, allophanate, and/or biuret, and/or isocyanurate, uretdione groups and/or iminooxadiazinetrione groups. Low molecular weight polyisocyanates containing urethane groups, such as can be obtained by reaction of IPDI or TDI, employed in excess, with simple polyhydric alcohols of molecular weight range 62 to 300, in particular with trimethylolpropane or glycerol, are furthermore suitable.

Polyisocyanates with an isocyanurate, iminooxadiazinedione or biuret structure based on hexamethylene-diisocyanate (HDI), isophorone-diisocyanate (IPDI) and/or 2,4'- and/or 4,4'-diisocyanatodicyclohexylmethane or mixtures of these compounds are particularly preferred.

The polyisocyanates which are described above and are prepared by modification of monomeric diisocyanates can be freed from excess monomers, for example by thin film distillation, after the preparation. However, it is also possible for the reaction mixtures containing monomeric diisocyanates which are obtained after the modification to be employed immediately for the blocking.

Suitable polyisocyanates are furthermore the known prepolymers containing terminal isocyanate groups, such as are accessible, in particular, by reaction of the abovementioned simple polyisocyanates, preferably diisocyanates, with deficient amounts of organic compounds having at least two functional groups which are reactive towards isocyanates. In these known prepolymers, the ratio of isocyanate groups to hydrogen atoms which are reactive towards NCO corresponds to 1.3:1 to 20:1, preferably 1.5:1 to 3:1, the hydrogen atoms preferably originating from hydroxyl groups. The nature and ratios of amounts of the starting materials employed in the preparation of NCO prepolymers are preferably chosen such that the NCO prepolymers preferably have an average NCO functionality of 2 to 3 and a number-average molecular weight of 500 to 10,000, preferably 800 to 4,000. After preparation of the prepolymers it is possible to remove unreacted polyisocyanate, preferably by distillation.

The polyisocyanates mentioned can of course also be employed as mixtures with one another.

The preparation of the blocked polyisocyanates (I) according to the invention can be carried out by methods known per se. For example, one or more polyisocyanates can be initially introduced into the reaction vessel and the blocking agent can be metered in (for example over a period of about 10 min), while stirring. The mixture is stirred until free isocyanate is no longer detectable. It is also possible to block one or more polyisocyanates with a mixture of two or more blocking agents.

However, it is also possible to react only some of the free NCO groups of the polyisocyanates with the blocking agents according to the invention and to react the remainder with an excess of polyesters, polyurethanes and/or polyacrylates, and optionally mixtures thereof, containing hydroxyl groups which are described in detail later, so that a polymer containing free hydroxyl groups and blocked NCO groups which crosslinks on heating to suitable stoving temperatures without the addition of further substances containing isocyanate groups and/or hydroxyl groups is formed.

It is furthermore possible to react only some of the free NCO groups of diisocyanates with the blocking agents according to the invention and then to react some of the non-blocked NCO groups to form polyisocyanates built-up from at least two diisocyanates.

The preparation of the blocked polyisocyanates and self-crosslinking one-component stoving-systems can optionally be carried out in a suitable organic solvent. Suitable solvents are, for example, the lacquer solvents which are conventional per se, such as e.g. ethyl acetate, butyl acetate, 1-methoxypropyl 2-acetate, 3-methoxy-n-butyl acetate, acetone, 2-butanone, 4-methyl-2-pentanone, cyclohexanone, toluene, xylene, N-methylpyrrolidone, chlorobenzene or white spirit. Mixtures which contain above all relatively highly substituted aromatics, such as are commercially available, for example, under the names solvent naphtha, Solvesso® (Exxon Chemicals, Houston, USA), Cypar® (Shell Chemicals, Eschborn, Del.), Cyclo Solo (Shell Chemicals, Eschborn, Del.), Tolu Solo (Shell Chemicals, Eschborn, Del.), Shellsol® (Shell Chemicals, Eschborn, Del.), are also suitable. However, the solvents can also be added after the preparation of the blocked polyisocyanates according to the invention, for example to lower the viscosity. In this case alcohols, such as, for example, isobutanol can also be used, since the NCO groups present are then reacted completely with the isocyanate-reactive groups. Preferred solvents are acetone, butyl acetate, 2-butanone, 1-methoxypropyl 2-acetate, xylene, toluene, mixtures which contain above all relatively highly substituted aromatics, such as are commercially available, for example, under the names solvent naphtha, Solvesso® (Exxon Chemicals, Houston, USA), Cypar® (Shell Chemicals, Eschborn, Del.), Cyclo Solo (Shell Chemicals, Eschborn, Del.), Tolu Solo (Shell Chemicals, Eschborn, Del.), Shellsol® (Shell Chemicals, Eschborn, Del.).

Catalysts, co-solvents and other auxiliary substances and additives can also be used in the preparation of the polyisocyanates according to the invention.

The blocked polyisocyanates according to the invention are used for the preparation of binders for lacquers, paints and other stoving systems, such as adhesives and elastomers, and serve here as a crosslinking agent for polyol components.

The blocked polyisocyanates according to the invention are, as described above, self-crosslinking polymers and/or can also be used as crosslinking agents for polyol components. Possible polyol components, which can also be employed as mixtures, are polyhydroxy-polyesters, polyhydroxy-polyethers or other polymers containing hydroxyl groups, e.g. the polyhydroxy-polyacrylates, which are known per se, with a hydroxyl number of 20 to 200, preferably 50 to 130, based on the 100% products, or polyhydroxy-carbonates or polyhydroxy-urethanes.

Examples of suitable polyester-polyols are, in particular, the reaction products, which are known per se in polyurethane chemistry, of polyhydric alcohols, for example alkanepolyols of the type mentioned by way of example, with excess amounts of polycarboxylic acids or polycarboxylic acid anhydrides, in particular dicarboxylic acids or dicarboxylic acid anhydrides. Suitable polycarboxylic acids or polycarboxylic acid anhydrides are, for example, adipic acid, phthalic acid, isophthalic acid, phthalic anhydride, tetrahydrophthalic anhydride, hexahydro-phthalic anhydride, maleic acid, maleic anhydride, Diels-Alder adducts thereof with cyclopentadiene, fumaric acid or dimeric or trimeric fatty acids. Any desired mixtures of the polyhydric alcohols mentioned by way of example or any desired mixtures of the acids or acid anhydrides mentioned by way of example can of course be employed in the preparation of the polyester-polyols.

The preparation of the polyester-polyols is carried out by known methods, such as are described e.g. in Houben-Weyl, Methoden der organischen Chemie, volume XIV/2, G. Thieme-Verlag, 1963, pages 1 to 47. The hydrophilic modification of these polyhydroxy compounds which may be necessary is carried out by methods known per se, such as are described, for example, in EP-A 0 157 291 or EP-A 0 427 028.

Suitable polyether-polyols are the ethoxylation and/or propoxylation products, which are known per se from polyurethane chemistry, of suitable 2- to 4-functional starter molecules, such as e.g. water, ethylene glycol, propanediol, trimethylolpropane, glycerol and/or pentaerythritol.

The polyhydroxy-polyacrylates are copolymers, which are known per se, of styrene with simple esters of acrylic acid and/or methacrylic acid, hydroxyalkyl esters, such as, for example, the 2-hydroxyethyl, 2-hydroxypropyl, 2-, 3- or 4-hydroxybutyl esters, of these acids being co-used for the purpose of introducing the hydroxyl groups.

Water-containing 1C polyurethane lacquers can also be prepared by dispersing the optionally solvent-containing blocked polyisocyanates according to the invention in water together with a hydrophilically modified polymer containing hydroxyl groups.

The preparation of the lacquers, paints and other formulations using the polyisocyanates according to the invention is carried out by methods known per se. In addition to the polyisocyanates and polyols, conventional additives and other auxiliary substances (e.g. solvents, pigments, fillers, flow agents, defoamers, catalysts) can be added to the formulations in amounts which can easily be determined by the expert by orientating experiments.

Further compounds which can react with compounds which contain NCO-reactive groups can also be employed as an additional crosslinking agent component. These are, for example, aminoplast resins. The condensation products, known in lacquer technology, of melamine and formaldehyde or urea and formaldehyde are to be regarded as aminoplast resins. All conventional melamine-formaldehyde condensates which are not etherified or are etherified with saturated monoalcohols having 1 to 4 C atoms are suitable. In the case of the co-use of other crosslinking agent components, the amount of binder with NCO-reactive hydroxyl groups must be adapted accordingly.

The blocked polyisocyanates according to the invention can be used for the preparation of stoving lacquers, e.g. for industrial lacquering and in first lacquering of automobiles. For this, the coating compositions according to the invention can be applied by knife-coating, dipping, spray application, such as compressed air or airless spraying, and by electrostatic application, for example high speed rotary bell application. The dry film layer thickness here can be, for example, 10 to 120 μm. Curing of the dried films is carried out by stoving in temperature ranges from 90 to 160° C., preferably 110 to 140° C. The blocked polyisocyanates according to the invention can be employed for the preparation of stoving lacquers for continuous belt coating, it being possible for maximum stoving temperatures, known to the expert as "peak temperatures", or if the substrate is a metal as "peak metal temperature", of between 130 and 300° C., preferably 190 to 260° C., and dry film layer thicknesses of, for example, 3 to 40 μm to be reached.

As the following examples, which do not limit the invention, demonstrate, the object on which the invention is based is achieved by the polyisocyanates and self-crosslinking stoving systems according to the invention. In combination with polyols, the polyisocyanates according to the invention have lower crosslinking and stoving temperatures than butanone oxime-blocked polyisocyanates, are stable to crystallization in organic solutions and can be prepared in a simple manner. Furthermore, organic solutions of the blocked polyisocyanates according to the invention are significantly less viscous than the conventional blocked polyisocyanates, which is desirable in respect of reducing the solvent content in modern lacquer systems.

EXAMPLES

The percentage data are in per cent by weight, unless stated otherwise. The solids content and BNCO content are calculated parameters which are calculated as follows:

Solids content in %=[(total weight-total weight of solvents) divided by the total weight] multiplied by 100

BNCO content in %=[(eq. of blocked NCO groups multiplied by 42) divided by the total weight] multiplied by 100

The particle sizes were determined by laser correlation spectroscopy (LCS).

Origin of the Starting Substances:

Polyisocyanate A1

Desmodur® N3300, Bayer AG, lacquer polyisocyanate containing isocyanurate groups and based on 1,6-diisocyanatohexane (HDI) with an NCO content of 21.8 wt. %, a viscosity at 23° C. of approx. 3,000 mPas and an NCO functionality of approx. 3.5.

Polyisocyanate A2

Desmodur® Z4470BA, Bayer AG, lacquer polyisocyanate containing isocyanurate groups and based on isophorone-diisocyanate (IPDI), containing 30 wt. % butyl acetate with an NCO content of 11.8 wt. %, a viscosity at 23° C. of approx. 700 mPas and an NCO functionality of approx. 3.4.

Polyisocyanate A3

Desmodur® Z4470MPA/X, Bayer AG, lacquer polyisocyanate containing isocyanurate groups and based on isophorone-diisocyanate (IPDI), containing 30 wt. % of a 1:1 mixture of xylene and methoxypropyl acetate with an NCO content of 11.8 wt. %, a viscosity at 23° C. of approx. 700 mpas and an NCO functionality of approx. 3.4.

Blocking Agent B1

86.09 g methyl acrylate were added, while stirring at room temperature, to 73.14 g tert-butylamine dissolved in 160.0 g methanol and the clear solution formed was stirred at room temperature for a further 16 h. The solvent was distilled off and 158.1 g of a product of the formula

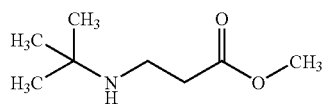

were obtained in a purity sufficient for further reaction to give the blocked polyisocyanate.

Blocking Agent B2

100.1 g methyl methacrylate were added, while stirring at room temperature, to 95.09 g tert-butylamine dissolved in 175.0 g ethanol and the clear solution formed was stirred at 70° C. for a further 72 h. The readily volatile constituents were distilled off, the product phase was filtered and 165.7 g of a product of the formula

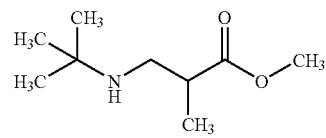

were obtained as the filtrate in a purity sufficient for further reaction to give the blocked polyisocyanate.

Blocking Agent B3

128.1 g tert-butyl acrylate were added, while stirring at room temperature, to, 73.14 g tert-butylamine dissolved in 200.0 g methanol and the clear solution formed was stirred at room temperature for a further 16 h. The solvent was distilled off and 199.1 g of a product of the formula

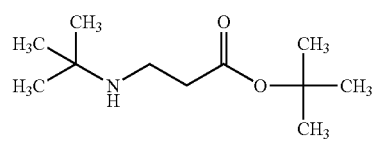

were obtained in a purity sufficient for further reaction to give the blocked polyisocyanate.

Blocking Agent B4

86.09 g methyl acrylate were added, while stirring at room temperature, to 99.18 g cyclohexylamine dissolved in 185.0 g methanol and the clear solution formed was stirred at room temperature for a further 16 h. The solvent was distilled off and 184.2 g of a product of the formula

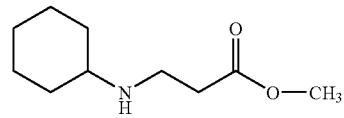

were obtained in a purity sufficient for further reaction to give the blocked polyisocyanate.

Blocking Agent B5

100.1 g methyl methacrylate were added, while stirring at room temperature, to 59.0 g isopropylamine dissolved in 135.0 g methanol and the clear solution formed was stirred at room temperature for a further 12 h. The solvent was distilled off and 158.2 g of a product of the formula

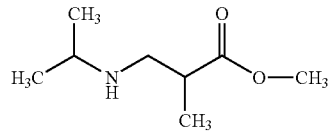

were obtained in a purity sufficient for further reaction to give the blocked polyisocyanate.

Blocking Agent B6

100.1 g crotonic acid methyl ester were added, while stirring at room temperature, to 73.14 g tert-butylamine dissolved in 175.0 g ethanol and the clear solution formed was stirred at 70° C. for a further 72 h. The solvent was distilled off and 168.9 g of a product of the formula

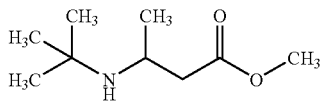

were obtained in a purity sufficient for further reaction to give the blocked polyisocyanate.

Example 1

Preparation of a Solvent-Containing Polyisocyanate Crosslinking Agent According to the Invention 159.3 g (1 eq.) of blocking agent B1 were added dropwise to 192.7 g (1 eq.) of polyisocyanate A1, dissolved in 88.0 g butyl acetate, in the course of 10 min. During this the temperature rose to approx. 40° C. After stirring at this temperature for 4 h, free NCO groups were no longer detectable by IR spectroscopy. 440.0 g of a clear product with the following characteristic data were obtained:

| Solids content: | 80% |
|---|---|
| BNCO content: | 9.54% |
| Viscosity at 23° C. | 3,500 mPas |

Comparison Example 1

Preparation of a Blocked Polyisocyanate Blocked with 3,5-dimethylpyrazole 96.0 g (1 eq.) 3,5-dimethylpyrazole were added to 192.7 g (1 eq.) of polyisocyanate A1 dissolved in 72.2 g butyl acetate. During this the temperature rose to approx. 60° C. After stirring at this temperature for 2 h, free NCO groups were no longer detectable by IR spectroscopy. 360.9 g of a clear product with the following characteristic data were obtained:

| Solids content: | 80% |
|---|---|
| BNCO content: | 11.6% |
| Viscosity at 23° C. | 10,000 mPas |

Example 2

Preparation of a Solvent-Containing Polyisocyanate Crosslinking Agent According to the Invention 159.3 g (1 eq.) of blocking agent B1 were added dropwise to 356 g (1 eq.) of polyisocyanate A2, dissolved in 69.0 g butyl acetate, in the course of 10 min. The temperature was increased to approx. 60° C. After stirring at this temperature for 6 h, free NCO groups were no longer detectable by IR spectroscopy. 584.3 g of a clear product with the following characteristic data were obtained:

| Solids content: | 70% |
|---|---|
| BNCO content: | 7.19% |
| Viscosity at 23° C. | 10,000 mPas |

Comparison Example 2

Preparation of a Blocked Polyisocyanate Blocked with 3,5-dimethylpyrazole 96.0 g (1 eq.) of crystalline 3,5-dimethylpyrazole were added-to 356 g (1 eq.) of polyisocyanate A2 dissolved in 41.0 g butyl acetate. The temperature was increased to approx. 60° C. After stirring at this temperature for 2 h, free NCO groups were no longer detectable by IR spectroscopy. 493 g of a clear product with the following characteristic data were obtained:

| Solids content: | 70% |
|---|---|
| BNCO content: | 8.52% |
| Viscosity at 23° C. | 70,000 mPas |

Example 3

Preparation of a Self-Crosslinking One-Component Stoving System According to the Invention 127.4 g (0.8 eq.) of blocking agent B1 were added dropwise to 391.6 g (1.1 eq.) of polyisocyanate A2, dissolved in 85 g butyl acetate, in the course of 10 min. During this the temperature rose to approx. 40° C. After stirring at this temperature for 4 h, 935 g (1.1 eq.) Desmophen® T XP 2013, Bayer AG, oil-free polyester containing hydroxyl groups, 75% in solvent naphtha 100 with an OH content according to DIN 53 240/2 of 2.0%, were added and the mixture was subsequently stirred at 70° C. for a further 4 h, after which free NCO groups were no longer detectable by IR spectroscopy. After dilution with 300 g butyl acetate, 1,839.0 g of a clear product with the following characteristic data were obtained:

| Solids content: | 60% |
|---|---|
| Blocked NCO groups: | 0.8 eq. |
| Free hydroxyl groups | 0.8 eq. |
| Viscosity at 23° C. | 750 mPas |

Comparison Example 3

Preparation of a Self-Crosslinking One-Component Stoving System with Butanone Oxime Blocking 69.6 g (0.8 eq.) of blocking agent B1 were added dropwise to 391.6 g (1;1 eq.) of polyisocyanate A2 in the course of 10 min. During this the temperature rose to approx. 40° C. After stirring at this temperature for 4 h, 935 g (1.1 eq.)

Desmophen® T XP 2013, Bayer AG, oil-free polyester containing hydroxyl groups, 75% in solvent naphtha 100 with an OH content according to DIN 53 240/2 of 2.0%, were added and the mixture was subsequently stirred at 70° C. for a further 4 h, after which free NCO groups were no longer detectable by IR spectroscopy. After dilution with 345 g butyl acetate, 1,741.2 g of a clear product with the following characteristic data were obtained:

| Solids content: | 60% |
|---|---|
| Blocked NCO groups: | 0.8 eq. |
| Free hydroxyl groups: | 0.8 eq. |
| Viscosity at 23° C. | 900 mPas |

It can be seen that the polyisocyanates of examples 1–3 blocked with blocking agent B1 have a lower viscosity than the corresponding polyisocyanates of comparison examples 1–3 blocked with 3,5-dimethylpyrazole or butanone oxime.

Example 4

Preparation of a Solvent-Containing Polyisocyanate Crosslinking Agent 173.3 g (1 eq.) of blocking agent B2 were added dropwise to 192.7 g (1 eq.) of polyisocyanate A1, dissolved in 157.0 g butyl acetate, in the course of 10 min. During this the temperature rose to approx. 40° C. After stirring at this temperature for 4 h, free NCO groups were no longer detectable by IR spectroscopy. 523.0 g of a clear product with the following characteristic data were obtained:

| Solids content: | 70% |
|---|---|
| BNCO content: | 8.03% |
| Viscosity at 23° C. | 2,000 mPas |

Example 5

Preparation of a Solvent-Containing Polyisocyanate Crosslinking Agent 201.3 g (1 eq.) of blocking agent B3 were added dropwise to 192.7 g (1 eq.) of polyisocyanate A1, dissolved in 131.0 g butyl acetate, in the course of 10 min. During this the temperature rose to approx. 40° C. After stirring at this temperature for 4 h, free NCO groups were no longer detectable by IR spectroscopy. 525.0 g of a clear product with the following characteristic data were obtained:

| Solids content: | 75% |
|---|---|
| BNCO content: | 8.00% |
| Viscosity at 23° C. | 2,500 mPas |

Example 6

Preparation of a Solvent-Containing Polyisocyanate Crosslinking Agent 185.3 g (1 eq.) of blocking agent B4 were added dropwise to 192.7 g (1 eq.) of polyisocyanate A1, dissolved in 126.0 g butyl acetate, in the course of 10 min. During this the temperature rose to approx. 40° C. After stirring at this temperature for 4 h, free NCO groups were no longer detectable by IR spectroscopy. 504.0 g of a clear product with the following characteristic data were obtained:

| Solids content: | 75% |
|---|---|
| BNCO content: | 8.33% |
| Viscosity at 23° C. | 3,000 mPas |

Example 7

Preparation of a Solvent-Containing Polyisocyanate Crosslinking Agent 145.3 g (1 eq.) of blocking agent B5 were added dropwise to 192.7 g (1 eq.) of polyisocyanate A1, dissolved in 145.0 g butyl acetate, in the course of 10 min. During this the temperature rose to approx. 40° C. After stirring at this temperature for 4 h, free NCO groups were no longer detectable by IR spectroscopy. 482.9 g of a clear product with the following characteristic data were obtained:

| Solids content: | 70% |
|---|---|
| BNCO content: | 8.71% |
| Viscosity at 23° C. | 2,500 mPas |

Example 8

Preparation of a Solvent-Containing Polyisocyanate Crosslinking Agent 173.3 g (1 eq.) of blocking agent B6 were added dropwise to 192.7 g (1 eq.) of polyisocyanate A1, dissolved in 157.0 g butyl acetate, in the course of 10 min. During this the temperature rose to approx. 40° C. After stirring at this temperature for 4 h, free NCO groups were no longer detectable by IR spectroscopy. 523.0 g of a clear product with the following characteristic data were obtained:

| Solids content: | 70% |
|---|---|
| BNCO content: | 8.03% |
| Viscosity at 23° C. | 2,000 mPas |

Comparison Example 4

Solvent-Containing Polyisocyanates Blocked with diisopropylamine or 1,2,4-triazole or malonic acid diethyl ester 192.7 g of polyisocyanate A1 were diluted with 136 g butyl acetate, and 101.0 g diisopropylamine (1 eq.) were added under dry nitrogen, while stirring, a slight exothermicity being observed. When the addition was complete the mixture was heated to 70° C. and, after stirring at this temperature for 30 min, the mixture was cooled to room temperature. Free isocyanate groups were subsequently no longer detectable in the IR spectrum. A clear, almost colour less product with the following characteristic data was obtained:

| Solids content: | 65% |
|---|---|
| BNCO content: | 9.30% |
| Viscosity at 23° C. | 1,900 mPas |

After storage at room temperature for 14 days, solidification started due to crystallization. After storage at room temperature for 18 days, a solid, white opaque mass had formed. The products from examples 1–8 showed no signs of crystallization or solidification even after 12 weeks. A blocked polyisocyanate prepared analogously, blocked with 1,2,4-triazole and based on polyisocyanate A1 already crystallized during preparation. A blocked polyisocyanate prepared analogously, blocked with malonic acid diethyl ester and based on polyisocyanate A1 crystallizes after approx. 21 days.

Example and Comparison Example 9

Production of a Coating from the Self-Crosslinking One-Component Stoving System of Example 3 and Comparison Example 1

In each case 1.4 g dibutyltin dilaurate (DBTL), 0.15 g Modaflow® (flow auxiliary, acrylic copolymer from Solutia, 10% in methoxypropyl acetate) and 0.15 g Baysilon® OL 17 (flow auxiliary, polyether-polysiloxane, 10% in methoxypropyl acetate, Bayer AG, Leverkusen) were added to in each case 142.9 g of the products from example 3 and comparison example 1 and the mixture was in each case stirred intimately. Using a doctor knife, the two mixtures were applied to in each case three glass plates and the solvent on these was evaporated in air for 10 min. After stoving for 30 min in a circulating air oven at 100° C., 140° C. and 160° C. respectively, coatings with a dry film layer thickness of 40 µm were obtained. To test the crosslinking, the resistance of the resulting films to solvents was determined.

TABLE 1

Resistances to solvents

| System from example 3 | | | |
|---|---|---|---|
| Stoving temperature | 100° C. | 140° C. | 160° C. |
| (X/MPA/EA/Ac [rating][1),2)] | | | |
| 1 min | 3 4 4 5 | 1 1 2 3 | 1 1 2 3 |
| 5 min | 4 4 5 5 | 2 3 4 4 | 2 3 4 4 |
| System from comparison example 1 | | | |
| Stoving temperature | 100° C. | 140° C. | 160° C. |
| (X/MPA/EA/Ac [rating][1),2)] | | | |
| 1 min | 5 5 5 5 | 2 3 3 4 | 1 1 2 3 |
| 5 min | 5 5 5 5 | 3 4 5 5 | 2 3 4 4 |

[1)]0 - good; 5 - poor,
[2)]X = xylene, MPA = methoxypropyl acetate, EA = ethyl acetate, Ac = acetone As can be seen from table 1, with the self-crosslinking one-component stoving system of example 3 the same resistances to solvents are achieved by stoving at 140° C. for 30 min as with stoving at 160° C., while with the self-crosslinking one-component stoving system of comparison example 1 the final coating properties are achieved only after stoving under higher temperatures.

Example and Comparison Example 10

Preparation of a 1C PU Clear Lacquer Starting from the Blocked Polyisocyanate According to the Invention of Example 1 and a 1C PU Clear Lacquer Starting from a Polyisocyanate Blocked with 3,5-dimethylpyrazole 0.75 g dibutyltin dilaurate (DBTL), 0.08 g Modaflow® (flow auxiliary, acrylic copolymer from Solutia, 10% in methoxypropyl acetate) and 0.08 g Baysilon OL 17 (flow auxiliary, polyether-polysiloxane from Bayer AG, Leverkusen, 1% in methoxypropyl acetate) were added to 44.0 g of the product from example 1 and 57.5 g Desmophen® A 870 (OH-functional polyacrylate polymer, Bayer AG, Leverkusen, 70% in butyl acetate, with an OH content according to DIN 53 240/2 of 3.0%) and the mixture was stirred intimately. Using a doctor knife, the mixture was applied to two aluminium sheets precoated with an aqueous white base lacquer and the solvent was evaporated from these in air for 10 min. After stoving for 30 min in a circulating air oven at 120° C. and 140° C. respectively, coatings with a dry film layer thickness of 40 µm were obtained. Table 2 contains an overview of the lacquer properties determined on the coatings.

0.7 g dibutyltin dilaurate (DBTL), 0.07 g Modaflow® (flow auxiliary, acrylic copolymer from Solutia, 10% in methoxypropyl acetate) and 0.07 g Baysilon® OL 17 (flow auxiliary, polyether-polysiloxane, 1% in methoxypropyl acetate, Bayer AG, Leverkusen) were added to 40.0 g Desmodur® BL VP LS 2253 (Bayer AG, polyisocyanate blocked with dimethylpyrazole and based on Desmodur® N 3300, Bayer AG, 75% in MPA/solvent naphtha) and 57.5 g Desmophen®. A 870 (OH-functional polyacrylate polymer, Bayer AG, Leverkusen, 70% in butyl acetate, with an OH content according to DIN 53 240/2 of 3.0%) and the mixture was stirred intimately. Using a doctor knife, the mixture was applied to an aluminium sheet precoated with an aqueous white base lacquer and the solvent was evaporated from this in air for 10 min. After stoving for 30 min in a circulating air oven at 140° C. a coating with a dry film layer thickness of 40 µm was obtained. Table 2 contains an overview of the lacquer properties determined on the coating.

TABLE 2

Comparison of polyisocyanates blocked with N-tert-butyl-β-alanine methyl ester with polyisocyanates blocked with 3,5-dimethylpyrazole

| Description | Blocked polyisocyanate according to the invention from example 1 | VP LS 2253 |
|---|---|---|
| PIC basis | N 3300 | N 3300 |
| Blocking agent | N-tert-butyl-β-alanine methyl ester | 3,5-dimethyl-pyrazole |
| Polyol | A 870 | A 870 |
| Catalyst | 1.0% DBTL | 1.0% DBTL |
| Visual evaluation of the lacquer | clear | clear |
| Stoving conditions | 30' 120° C.   30' 140° C. | 30' 140° C. |
| Visual evaluation of the lacquer film | clear         clear | clear |

TABLE 2-continued

Comparison of polyisocyanates blocked with N-tert-butyl-β-alanine methyl ester with polyisocyanates blocked with 3,5-dimethylpyrazole

| Description | Blocked polyisocyanate according to the invention from example 1 | | VP LS 2253 |
|---|---|---|---|
| König pendulum damping [oscillations] [s] | 183 | 191 | 197 |
| Resistance to solvents (X/MPA/EA/Ac) [rating][1)] | | | |
| 1 min | 1 2 3 4 | 0 1 2 3 | 1 1 2 3 |
| 5 min | 2 2 4 4 | 2 2 4 4 | 2 2 4 4 |
| Resistance to chemicals [° C.] (gradient oven) | | | |
| tree resin | 36 | 36 | 36 |
| brake fluid | 36 | 36 | 36 |
| pancreatin, 50% | 36 | 36 | 36 |
| NaOH, 1% | 40 | 43 | 44 |
| H$_2$SO$_4$, 1% | 44 | 45 | 45 |
| FAM, 10 min [rating][1)] | 1 | 1 | 2 |
| Scratch resistance (Amtec Kistler laboratory washing unit)[2)] | | | |
| Starting gloss [20°] | 91.5 | 91.3 | 91.1 |
| Loss of gloss (Δgl) after 10 washing cycles [20°] | 29.5 | 28.1 | 32.8 |
| Relative residual gloss [%] | 67.8 | 69.2 | 64.0 |
| Thermo-yellowing clear lacquer on aqueous base lacquer | | | |
| Starting yellowing [b] | 1.5 | 1.8 | 0.8 |
| Overstoving yellowing at 30' 140° C. [Δb] | 1.5 | 2.1 | 1.0 |
| Overstoving yellowing at 30' 160° C. [Δb] | 0.0 | 0.3 | 0.2 |

[1)]0 - good; 5 - poor

It is clear that the lacquer system based on the polyisocyanate according to the invention already has properties at a stoving temperature of 120° C. which are comparable to those of the lacquer system based on the polyisocyanate blocked with 3,5-dimethylpyrazole stoved at 140° C. At 140° C. coatings with very good solvent, scratch and chemical resistances and a low tendency towards yellowing are obtained with the lacquers according to the invention.

Example 11

Preparation of an Aqueous 1C PU Clear Lacquer Starting from the Blocked Polyisocyanate of Example 1

A solution of 28.77 g (0.43 eq. OH) dimethylpropionic acid in 57.54 g N-methylpyrrolidone was added dropwise to 95.41 g (0.86 eq.) isophorone-diisocyanate in the course of 5 min, while stirring at 50° C. After stirring at 80° C. for a further 150 min an NCO content of 9.19 wt. % was reached. After addition of 28.08 g (0.08 eq.) of polyisocyanate A3 and 446.72 g (1.404 eq. OH) of a polyester built up on adipic acid, isophthalic acid, trimethylolpropane, neopentylglycol and propylene glycol, the reaction mixture was stirred at 80° C. for a further 180 min, after which NCO groups were no longer detectable by IR spectroscopy. 198.02 g of the polyisocyanate according to the invention from example 1 were then added at 70° C. and the mixture was subsequently stirred for a further 10 min. 19.12 g (0.215 mol) dimethylethanolamine were then added and the mixture was subsequently stirred for a further 10 min. 833.23 g deionized water, heated at 70° C., were then added, while stirring vigorously, and the mixture was subsequently stirred for 90 min and allowed to cool, while stirring. The dispersion obtained had the following properties:

| Solids content: | 45% |
|---|---|
| pH: | 8.08 |
| Viscosity at 23° C.: | 3,400 mPas |
| Particle size: | 59 nm |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Blocked polyisocyanates according to formula (I)

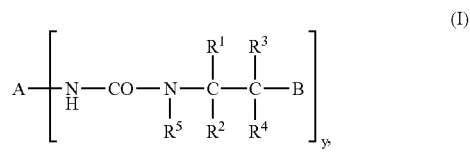

wherein independently of one another
R$^1$–R$^4$ are the same or different and denote hydrogen, C$_1$–C$_6$-alkyl or cyoloalkyl,
R$^5$ denotes C$_1$–C$_{10}$-alkyl or C$_3$–C$_{10}$-cycloalkyl,
y denotes a number from 2 to 8,
A denotes a radical of an isocyanate having functionality y, and
B represents

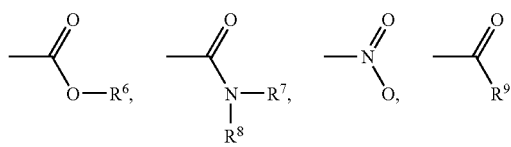

wherein
independently of one another
R$^6$–R$^8$ are the same or different and denote C$_1$–C$_6$-alkyl or C$_3$–C$_6$cycloalkyl and
R$^9$ denotes hydrogen, C$_1$–C$_6$-alkyl or C$_3$–C$_6$-cycloalkyl.

2. Blocked polyisocyanates according to claim 1, wherein R$^5$ represents an amyl, isopropyl, isobutyl or tert-butyl radical.

3. Blocked polyisocyanates according to claim 1, wherein R$^1$ represents a methyl radical and R$^2$, R$^3$, R$^4$ represent a hydrogen atom.

4. Blocked polyisocyanates according to claim 1, wherein R$^3$ represents a methyl radical and R$^1$, R$^2$, R$^4$ represent a hydrogen atom.

5. Blocked polyisocyanates according to claim 1, wherein R$^1$, R$^2$, R$^3$ and R$^4$ represent a hydrogen atom.

6. Blocked polyisocyanates according to claim 1, wherein both blocked polyisocyanate groups and free hydroxyl groups are present in one molecule.

7. A process for the preparation of the blocked polyisocyanates of formula (I) according to claim 1 comprising reacting polyisocyanates according to formula (II)

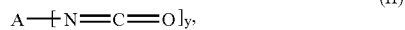

wherein A and y have the meaning given for formula (I) in claim 1, with secondary amines according to formula (III)

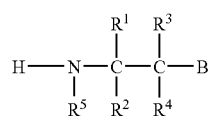

wherein $R^1$–$R^5$ and B have the meaning given for formula (I) in claim 1.

8. The process according to claim 7, which comprises reacting blocking agents (III), in the solvent used for their preparation and without further purification, with the polyisocyanates of formula (II).

9. A one-component polyurethane stoving system comprising the blocked polyisocyanates according to claim 1 as a crosslinking agent and one or more polyol components.

10. Elastomer compositions prepared by combining the blocked polyisocyanates according to claim 1 with one or more polyols.

11. Lacquer, paint or adhesive compositions comprising the blocked polyisocyanates according to claim 1 and one or more components selected from the group consisting of solvents, pigments, fillers, flow agents, defoamers, and catalysts.

12. Aqueous dispersions comprising the blocked polyisocyanates according to claim 1.

13. Solutions of blocked polyisocyanates according to claim 1 in organic solvents.

14. A process for coating substrates, comprising applying a coating formulation comprising the blocked polyisocyanates according to claim 1 to a substrate and stoving the coating at temperatures of 90 to 160° C.

15. A process for coating substrates, comprising applying a coating formulation comprising the blocked polyisocyanates according to claim 1 to a substrate and stoving the coating at a peak temperature of 130 to 300° C.

* * * * *